United States Patent [19]
Goatly

[11] Patent Number: 6,009,530
[45] Date of Patent: Dec. 28, 1999

[54] REAL TIME CLOCK SYNCHRONIZATION IN A TELECOMMUNICATIONS NETWORK

[75] Inventor: Bernard J Goatly, Nottingham, United Kingdom

[73] Assignee: GPT Limited, United Kingdom

[21] Appl. No.: 08/836,865

[22] PCT Filed: Nov. 28, 1995

[86] PCT No.: PCT/GB95/02784

§ 371 Date: Jun. 23, 1997

§ 102(e) Date: Jun. 23, 1997

[87] PCT Pub. No.: WO96/17278

PCT Pub. Date: Jun. 6, 1996

[30] Foreign Application Priority Data

Nov. 29, 1994 [GB] United Kingdom ............... 9424018

[51] Int. Cl.⁶ ........................................................... G06F 1/12
[52] U.S. Cl. ........................ 713/400; 713/502; 713/503
[58] Field of Search .................................. 395/551, 552, 395/553, 557, 558, 200.78; 713/400, 401, 502, 503; 709/248

[56] References Cited

U.S. PATENT DOCUMENTS 4,473,889  9/1984  Ross ........................................... 364/900

FOREIGN PATENT DOCUMENTS

| 0 253 096 A2 | 1/1988 | European Pat. Off. . |
| 0 283 106 A1 | 9/1988 | European Pat. Off. . |
| 0 315 028 A1 | 5/1989 | European Pat. Off. . |
| 0 564 220 A2 | 6/1993 | European Pat. Off. . |
| 60-236088 | 11/1985 | Japan . |

Primary Examiner—Dennis M. Butler
Attorney, Agent, or Firm—Kirschstein, et al.

[57] ABSTRACT

In a telecommunication network, a method of determining the accuracy of the real time clocks associated with each element of the network is disclosed. The method comprises sending a marker signal at a predetermined reference time along with the traffic signals to one or more elements in the network, and arranging the element to record the time of the arrival of the marker signal using its clock. The recorded time is then compared with the reference time at the network management center so as to determine the accuracy. In order to correct an inaccurate clock, a message signal is sent, so as to cause the clock to be adjusted by the difference between the reference and its recorded time.

4 Claims, 2 Drawing Sheets

REAL TIME CLOCK SYNCHRONIZATION IN A TELECOMMUNICATIONS NETWORK

This application is a 371 of PCT/GB95/02784 filed Nov. 28, 1995.

BACKGROUND OF THE INVENTION

This invention relates to a method of determining the accuracy of the real time clocks which are provided within each element of a distributed telecommunications network.

Managed Network Elements (NEs), for example a shelf of electronic switches each contain a Real Time Clock (RTC) which is used for time stamping event reports sourced from the respective element. Such reports may, for example, be the start or finish times of a traffic connection. It is clearly important that all the RTCs are synchronised to as great an accuracy as can be obtained. The known method of setting the RTC within each element relies on sending a "time set" message from the Network Management Centre (NMC) to the element. These messages suffer varying delays during transmission around the network and in practice have been found to provide a setting accuracy of only between 3 and 5 seconds, depending on the network size and loading of the network. The known setting method is "open looped"—the NMC has no way of knowing to what accuracy a respective RTC has been set after the time set command has been sent.

SUMMARY OF THE INVENTION

According to the present invention a method of operating a synchronous digital hierarchy telecommunication network, includes the steps of determining the accuracy of the real time clocks associated with each element of the network comprising; sending a marker signal at a reference time along with the traffic signals to one or more elements in the network such that the element records the time of arrival of the marker signal using its clock, causing the element to send back to a network management centre data indicative of the time of arrival of the marker signal, and comparing the recorded time to the reference time to determine the accuracy.

The invention makes use of the fact that the delays in traffic signals in a telecommunications network are low and relatively invariant and thus the marker signal can be transmitted to an element in the network substantially instantaneously, whereas the message signals previously described can take several seconds.

In a preferred embodiment a marker signal is generated by corrupting a traffic signal, each network element then being arranged to time stamp and record within its respective event log the onset (or finish) of the corrupted signal. The network management centre is preferably arranged to interrogate the event log of each network element so as to initiate the transmission back to the network management centre of the time of arrival data.

Once the inaccuracies have been determined there still remains the problem of setting the NE clock to an improved accuracy. In the past this was done by sending a message signal indicating the correct time to the network element. However, as previously described, due to delays in transmission there is no guarantee that each real time clock will be set to the correct time. Preferably therefore the method comprises the further step of setting an inaccurate clock by sending a message signal so as to cause the clock to be adjusted by the difference between the reference and its recorded time.

Because only a difference signal is being transmitted, it does not matter how long that signal takes to arrive at the respective network element.

BRIEF DESCRIPTION OF THE DRAWINGS

An example of the invention will now be described by way of example with reference to the accompanying diagrammatic drawings, in which.

DETAILED DESCRIPTION OF THE PREFERRED EMBODIMENTS

Figure 1:
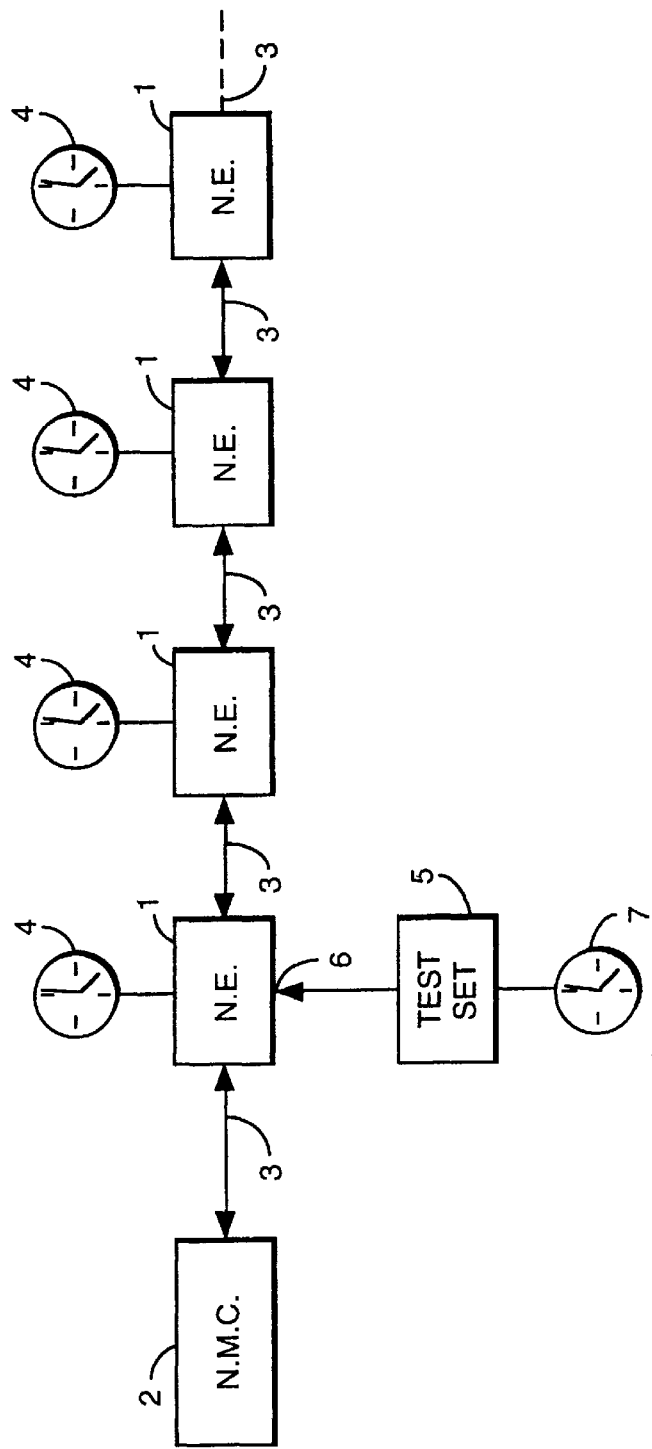
FIG. 1 shows schematically a telecommunications network.

Referring to FIG. 1 an SDH (Synchronous Digital Hierachy) telecommunications network comprises a plurality of Network Elements (NE) 1 which may be widely distributed and which are connected to each other and to a Network Management Centre (NMC) 2 by communications links 3, embedded within the traffic paths. Each Network Element 1 includes a Real Time Clock (RTC) 4.

When it is desired to check the accuracy of one or more of the RTCs 4, a test set 5 is arranged to inject a marker signal into an NE traffic port 6 along with the traffic signals and at a time determined by an accurate reference clock 7 such that the marker signal will be relayed with low delay to one or more NE's 1 within the network.

The arrival of the marker signal is time stamped by the respective NE's RTC 4 and recorded within it's event log (not shown). The Network Management Centre 2 then interrogates the NEs' event log and compares the arrival of the marker signal as indicated by the respective RTC 4 with the time of transmission as determined by the reference clock 7.

Figure 2:
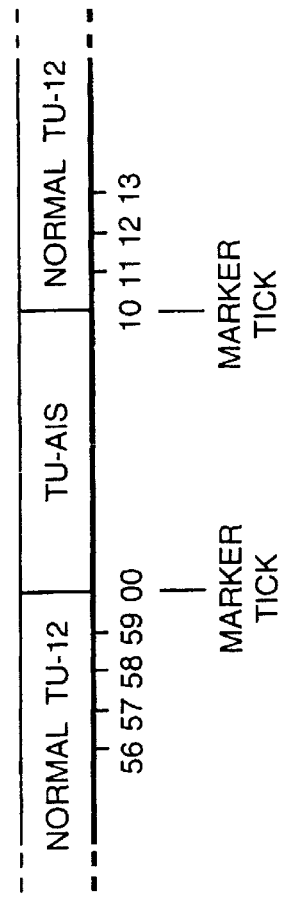
FIG. 2 shows schematically a portion of traffic signal incorporating a marker signal.
Figure 3:
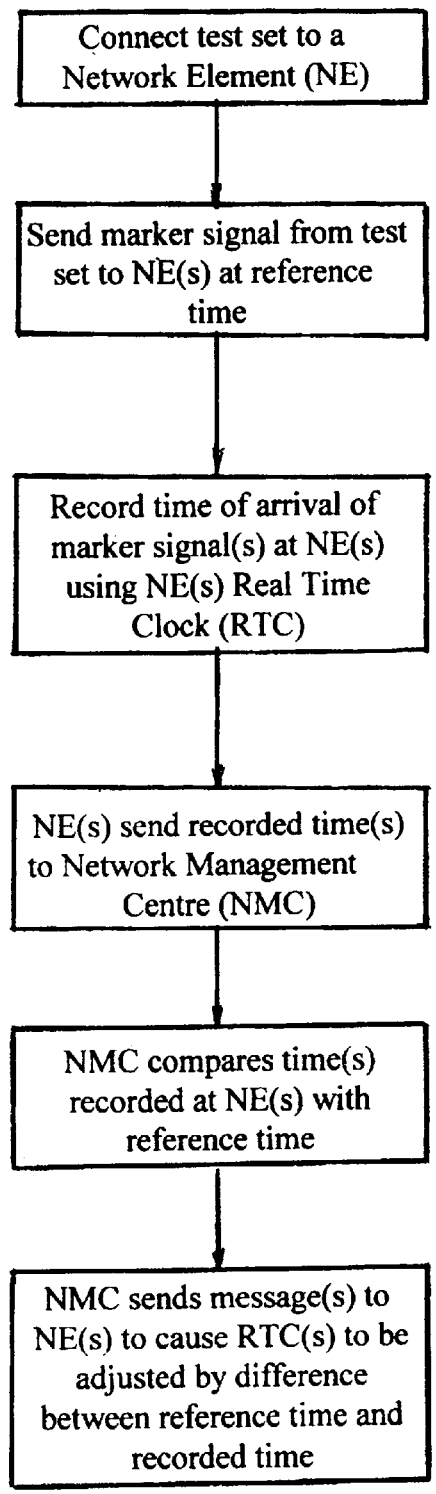
FIG. 3 shows a flow chart of the operation of the present invention.

In the SDH system described above the traffic signal may be an STM-1 signal (Synchronous Transmission Module, the '1' indicating the first level in SDH notation) containing a TU-12 signal (Tributary Unit, the '12' indicating a 2 Mbit/s signal). Referring to FIG. 2 at a time determined, e.g., from the MSF Rugby time standard the test set 5 is arranged at 00 seconds to transmit a TUAIS (Tributory Unit Alarm Indication Signal) of 10 seconds duration. An AIS signal within the traffic signals indicates to other Network Elements 1 that a fault has been found but that no action need be taken. The arrival of the AIS signal is recorded within the event log of each or a particular NE 1 as previously described.

If the NMC 2 determines that a particular RTC 4 is in error a message is sent indicating that the RTC is to be adjusted by the difference in time, typically a few seconds, between the time of transmission of the marker signal as indicated by the reference clock 7 and the time of arrival as indicated by the RTC 4.

Although as indicated it is the beginning of the marker signal against which the RTC 4 is calibrated, it is of course possible that the end of the signal can be used instead. Although the invention has been described with reference to an SDH system the invention is equally applicable to a PDH system (Plesiochronous Digital Hierarchy), or other type of similar network, such as the north American SONET network, and which is used to provide the time distribution.

I claim:

1. A method of operating a synchronous digital hierarchy (SDH) telecommunications network, the network comprising a plurality of interconnected Network Elements (NEs) which are connected to a Network Management Center (NMC) by communications links, each of the NEs including a traffic port and a Real Time Clock (RTC), the method comprising the steps of:

a) connecting a test set, said test set including an accurate reference clock, to the traffic port of one of the plurality of NEs, and injecting a marker signal at a time determined by the accurate reference clock, and relaying the marker signal by the communications links to at least one of the NEs;

b) time stamping and recording in a respective event log, the arrival of the marker signal at said at least one NE by reference to the respective RTC; and c) interrogating each event log by the NMC, and comparing a time of arrival of the marker signal at said at least one NE as determined by the respective RTC with a time of transmission as determined by the accurate reference clock.

2. The method as claimed in claim 1, and further comprising the step of resetting an inaccurate RTC by sending a message signal so as to cause the RTC to be adjusted by a determined difference between the time of transmission of the marker signal and the time of arrival recorded in the event log.

3. The method as claimed in claim 1, comprising the step of generating the marker signal by inserting a predetermined signal in the traffic signal.

4. The method as claimed in claim 1, in which the marker signal comprises a TU-12 signal and a Tributary Unit Alarm Indication Signal transmitted at the reference time.

* * * * *